United States Patent [19]

Petranto

[11] Patent Number: 4,863,198

[45] Date of Patent: Sep. 5, 1989

[54] SPLIT GLAND

[75] Inventor: Joseph J. Petranto, Los Alamos, N. Mex.

[73] Assignee: The United States of America as represented by the United States Department of Energy, Washington, D.C.

[21] Appl. No.: 110,079

[22] Filed: Oct. 14, 1987

Related U.S. Application Data

[63] Continuation of Ser. No. 32,265, Mar. 2, 1987, abandoned, which is a continuation of Ser. No. 836,651, Mar. 5, 1986, abandoned.

[51] Int. Cl.[4] .............................................. F16L 35/00
[52] U.S. Cl. ................................... 285/39; 285/334.5; 285/387; 411/433
[58] Field of Search ...................... 285/334.5, 356, 341, 285/342, 382.7, 393, 387, 388, 321, 39; 411/432, 433, 65, 64, 178

[56] References Cited

U.S. PATENT DOCUMENTS

| 519,568 | 5/1894 | Cooney | 285/356 X |
|---|---|---|---|
| 625,448 | 5/1899 | Jaenichen | 411/432 X |
| 919,913 | 4/1909 | Miller | 285/393 X |
| 1,441,138 | 1/1923 | Westervelt | 285/393 X |
| 3,160,055 | 12/1964 | Devine et al. | 411/65 |
| 3,679,237 | 7/1972 | DeAngelis | 285/387 X |
| 3,734,547 | 5/1973 | Kojima | 285/387 X |
| 4,132,146 | 1/1979 | Uhlig | 411/433 |
| 4,209,193 | 6/1980 | Ahlstone | 285/321 X |
| 4,343,496 | 8/1982 | Petranto | 285/39 |
| 4,471,978 | 9/1984 | Kramer | 285/321 |

FOREIGN PATENT DOCUMENTS

| 83419 | 8/1976 | Australia | 411/433 |
|---|---|---|---|
| 558224 | 6/1957 | Belgium | 411/433 |
| 1212927 | 3/1966 | Fed. Rep. of Germany | 411/64 |
| 898139 | 6/1944 | France | 411/432 |
| 678202 | 8/1979 | U.S.S.R. | 411/432 |
| 726374 | 4/1980 | U.S.S.R. | 411/432 |
| 455165 | 10/1936 | United Kingdom | 411/432 |

OTHER PUBLICATIONS

"Scanning for Ideas", *Machine Design*, Aug. 11, 1983, p. 44.

*Primary Examiner*—Randolph A. Reese
*Assistant Examiner*—Anthony Knight
*Attorney, Agent, or Firm*—Samuel M. Freund; Paul D. Gaetjens; Judson R. Hightower

[57] ABSTRACT

A split gland having only three parts is described. The gland has substantially the same stability to the relative motion of the constituent half-gland members during the attachment process to a female fitting as have more complicated designs. Ease of manufacture and use result from the reduction in complexity of the present invention.

6 Claims, 10 Drawing Sheets

SPLIT GLAND

This invention is the result of a contract with the Department of Energy (Contract No. W-7405-ENG-36).

This application is a continuation of application Ser. No. 32,265 filed on Mar. 2, 1987 now abandoned, which is a continuation of application Ser. No. 836,651 filed on Mar. 5, 1986 now abandoned.

BACKGROUND OF THE INVENTION

The present invention relates generally to glands and more particularly to a split gland which can be laterally installed over a tube instead of having to be slipped over the end thereof.

Glands find significant and varied use in industry. For example, gland applications include attaching pneumatic and hydraulic lines in automotive, marine and aircraft systems and the like. Conventional threaded glands must be slipped over the ends of the tubing employed. The tubing is then usually either flared or ferrules disposed thereon near the end thereof, and the threaded gland utilized to secure the tubing to appropriate fittings having matching threads, forming thereby fluid-tight connections.

The tubing is generally preformed or bent to form. Once the tubing is bent a sufficient amount, conventional glands cannot slide over the bend because the inside diameter of the gland must be sufficiently small to hold the tubing in position when the gland is threaded into a fitting. Therefore, conventional glands can only be slid along straight tubing to tubing having gentle bends.

Additionally, the threads of a gland are occasionally stripped during the connection process of the tubing to a fitting, the flats of the gland head become rounded, or the gland may be discovered to be defective after it is in place on the tubing and the tubing flared or the ferrule mounted thereby preventing its direct removal. In these situations, the tubing must be cut in order that a conventional gland be removed. Significant effort may be required to replace or reconnect the severed tubing, especially in the situation where the tubing is formed having a series of tight bends and/or the tubing assembly is positioned in a difficult-to-reach location. For these and other reasons known to those skilled in the art of fluid actuated machinery, for example, it is desirable to have a gland which can be laterally slipped over tubing.

Two references are known to the inventor which are relevant to the subject invention. First, U.S. Pat. No. 4,343,496, "Split Gland," issued to Joseph J. Petranto on Aug. 10, 1982, describes a split gland similar in outward appearance to that for the subject invention. The gland disclosed in the patent requires a U-shaped retainer to align the two, substantially mirror-image half glands. This retainer is positioned relative to the other parts of the gland by slots in the half glands, necessitating additional machining steps in the manufacture of the gland, and more complicated assembly and use thereof. It was originally believed by the inventor that a four piece split gland would be required to stabilize the assembled gland in order to enable it to be threaded into a female fitting without cross-threading occurring. The alternative was to employ a very stiff and bulky spring clamp which would render the gland difficult to use for its intended purpose. Subsequent to the filing of the first split gland patent, it was discovered that the embodiments of the present invention described hereinbelow provide the required rigidity of location of the two halves of the split gland without having to resort to an oversized or overstiff spring clamp. A second reference, "Scanning for Ideas," Machine Design, Aug. 11, 1983, page 44, briefly describes a snap-on fitting derived from the invention disclosed in the above-mentioned patent. Although the description states that the two gland halves are notched for alignment and held together by a flat metal spring, there is no disclosed manner in which the two notched surfaces might engage in any way in order to provide some locking or alignment capability. Another piece, which inserts into the notches, must be provided. Such a member is not disclosed in the description of the apparatus. From the sole notch shown in the cutaway representation of the split gland shown therein and the similarity to FIG. 4 of the Petranto patent, however, the missing member is most likely the retainer described in the patent.

SUMMARY OF THE INVENTION

Accordingly, it is an object of the subject invention to provide a gland which may be replaced without severing formed, flared or ferruled tubing.

Another object of the subject invention is to provide a gland which may be easily replaced when damaged in situ.

Yet another object of my invention is to provide a gland suitable for mounting on formed tubing disposed in areas having difficulty of access.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus hereof includes a male half-gland member having a cross section which includes a convex, semicircular outer portion and two flat inner portions. The convex, semicircular outer portion has a male threaded portion beginning at one end of the male half-gland member and a wrench-engaging portion at the other end of the male half-gland member. A cylindrical groove for receiving tubing is disposed symmetrically along the axis of the male half-gland member between the two generally flat inner portions and extends substantially the length of said male half-gland member. One of said generally flat inner portions has one elongated raised portion parallel to the axis. A matching female half gland member which is a mirror image of the male member except for having an elongated depression in one of said generally flat inner portions which is adapted to receive the elongated raised portion of the male member in place thereof. The male threaded portion of said female half-gland member has the same pitch and diameter as the male threaded portion of said male half-gland member. Clamping means for holding the flat inner portions of the male member and the female member fixedly in juxtaposition such that the male threaded portions line up, the wrench-engaging portions line up and the cylindrical grooves line up, whereby the assembled split gland can be resiliently laterally snapped over a tube positioned on the side thereof away from the elongated raised portion. See FIG. 1 hereinbelow.

In a second embodiment of the present invention, in accordance with its objects and purposes, the apparatus hereof also includes a male half-gland member and a female half-gland member substantially the same as those described hereinabove except that the elongated raised portion and the matching elongated depression of the first embodiment are replaced by a pin having a generally circular cross section and extending outwardly from one of said generally flat inner portions of the male half-gland member and a correspondingly configured depression formed in one of said generally flat inner portions of the female half-gland member and adapted to receive the pin of the male member. See FIG. 3 hereinbelow.

In a third embodiment of the present invention, in accordance with its objects and purposes, the apparatus hereof also includes a male and female half-gland member substantially the same as those described hereinabove except that the at least one elongated raised portion and the matching at least one elongated depression of the first embodiment are replaced by at least one elongated raised portion located on at least one of said generally flat inner portions of the male half-gland member perpendicular to the axis of the male member and in the region of the wrench-engaging portion thereof and at least one matching elongated depression located in at least one of said generally flat inner portions of the female half-gland member and adapted to receive the elongated raised portion of the male member. See FIG. 4 hereinbelow.

Benefits and advantages of the subject invention include the fact that malfunctioning or faulty glands can be replaced without having to sever and replace the tubing involved. This is due to the property of the split glands of the present invention which enables them to be reversibly slipped onto tubing and removed therefrom laterally to the tubing rather than having to be installed over an end thereof which would not be possible if the tubing is already preformed or bent, flared or has ferrules crimped onto it. Another advantage of the subject invention is that if the ferrule is locked by either being crimped or brazed onto the tube in the assembled apparatus and the gland was inadvertently not previously placed on the tube, the apparatus need not be discarded. Yet another advantage of the subject invention is that split glands can be slipped over tight bends in tubing.

BRIEF DESCRIPTION OF THE DRAWINGS

The accompanying drawings, which are incorporated in and form a part of the specification, illustrate four embodiments of the present invention and, together with the description, serve to explain the principles of the invention. In the drawings:

FIG. 7 is a schematic representation of the side view of the split gland for the embodiment of the present invention shown in FIG. 3 hereof showing the teardrop-shaped tube receiving bore of the assembled split gland, the circular raised portion of the male member, the circular depression of the female member, the radiused notch, the tubing starting notch, and the circular spring clip. Shown is the assembled split gland being installed laterally over a tube. Note that in the embodiment shown, unlike the embodiment described in FIGS. 1, 5, and 6 hereof, the tubing must pass over the raised portion of the male member and the spring clip is located in the wrench-engaging head rather than around the outer perimeter of the assembled gland. To avoid the former situation, the circular raised portion and the matching circular depression may be located on the side of the split gland away from the tube starting notch.

DETAILED DESCRIPTION OF THE PREFERRED EMBODIMENTS

Reference will now be made in detail to the present preferred embodiments of the invention, examples of which are illustrated in the accompanying drawings. Similar or identical structure will be denoted by the same call out numbers throughout.

Figure 1:
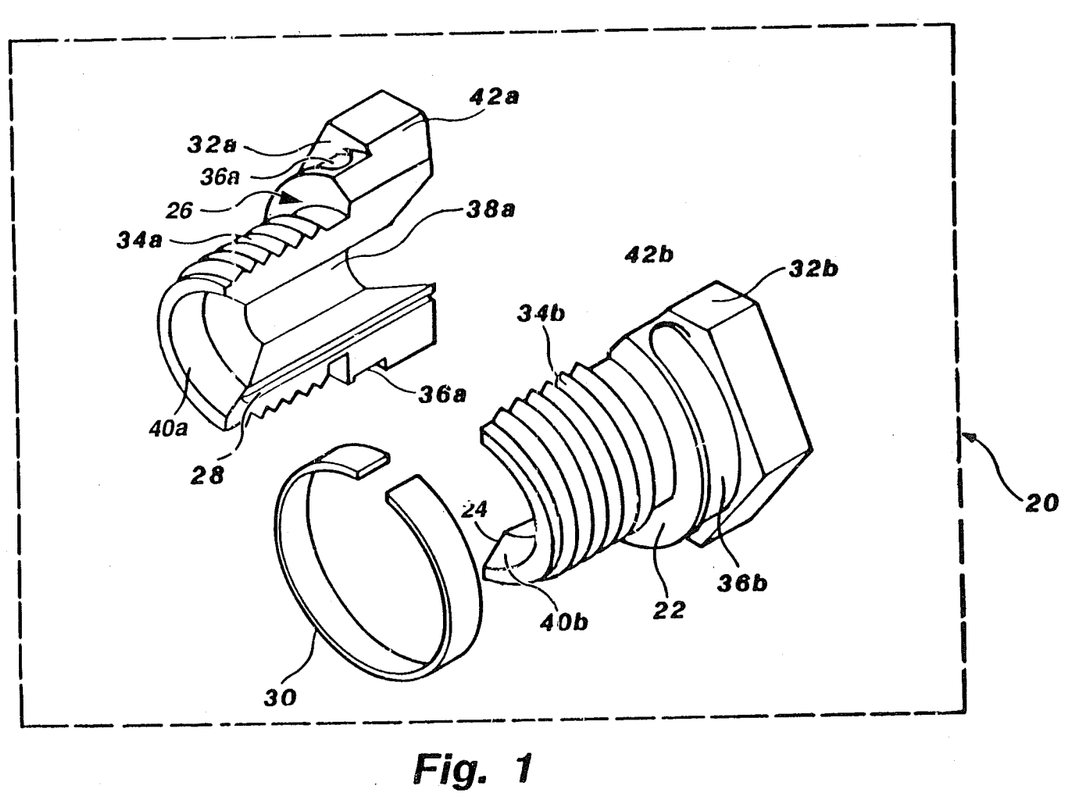
FIG. 1 is an exploded orthographic view of a first preferred embodiment of the subject split gland showing the male half-gland member with its longitudinally disposed, enlongated raised portion, the female half-gland member with its corresponding longitudinally disposed enlongated depression and one version of the circular spring clip.
Figure 2:
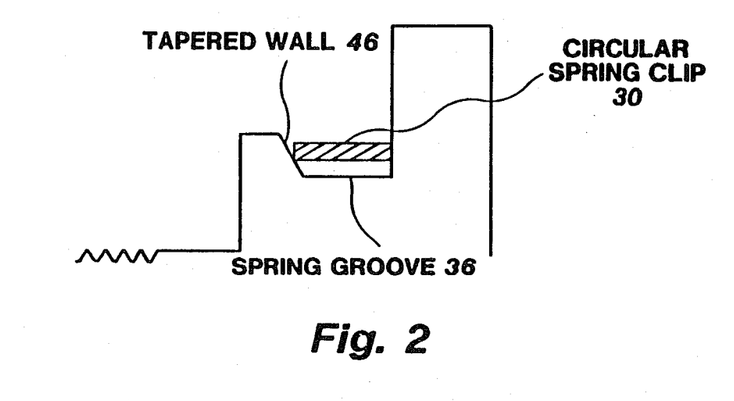
FIG. 2 is a cross sectional view of the tapered spring groove which permits an interference fit between the circular spring clip and the groove and prevents substantial relative axial motion between the half-gland members without the necessity of employing a spring clip of great mass and strength and without having to rely on precision fitting of the parts.
Figure 13:
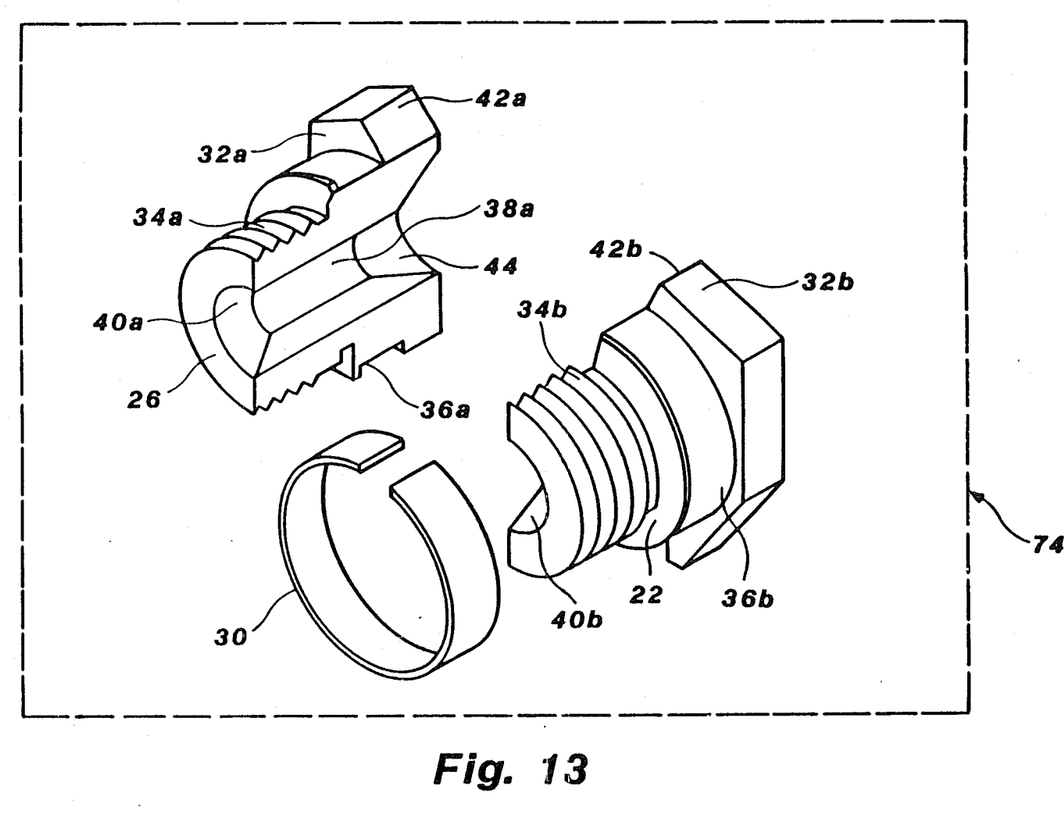
FIG. 13 is an exploded orthographic view of a fourth embodiment of the present invention showing a pair of mirror-image half-gland members each of which has an expanded spring clip receiving groove for receiving a wider and stiffer circular spring clip also shown therein.

Turning now to the drawings, FIG. 1 shows an exploded orthographic view of the first preferred embodiment of the subject split gland 20 showing the male half-gland member 22 with its lateral raised portion 24, the female half-gland member 26 with its corresponding lateral groove 28 and one version of the circular spring clip 30. Circular spring clip 30 is a resilient, open-ended, flat spring clip having a circumferential extent greater than 180°. Additional features of the split gland include corresponding wrench-engaging head portions for each half member 32a, b, and corresponding male threaded portions for each half member 34a, b adapted to be received by a female gland member, a corresponding spring groove for each half member 36a, b, a corresponding groove 38a in each half member adapted to receive ferruled or flared tubing, the matching tubing receiving grooves having a countersunk portion at the front end of each of said half members 40a, b adapted to receive one of either a flared or ferruled tubing termination, and a corresponding beveled portion 42a, b on each of the half members for causing the assembled split gland to spread apart in order to receive a tube against the action of the circular spring clip 30. As a tube is pushed against an assembled split gland, the tube engages beveled portions 42a, b which in turn facilitates the spreading apart of each half member 34a, b. A flared portion 44 (as illustrated in FIG. 13) may be provided in the rear portion of each of the half-gland members in order to permit greater flexibility in the movement of the assembled split gland around bends in the tubing. It should also be mentioned that the spring groove 36a, b is tapered to permit an interference fit of the circular spring clip without having to machine both parts to have a precision fit. This type of fit, as shown in FIG. 2 hereof, prevents substantial axial displacement of the two half-gland members relative to one another and further substantially prevents twisting thereof, and has been found to provide sufficient stability of the assembled split gland such that the gland can be screwed into a female receiving gland without any danger of cross-threading. It is this innovation in a design of this type of split gland that enabled the elmination of the horseshoe-shaped retaining ring described in issued U.S. Patent 4,343,496 mention hereinabove to be eliminated. Retainable wall 46 and circular spring clip 30 interact to produce the desired axial rigidity while maintaining sufficient flexibility to permit the lateral insertion of a tube into the split gland.

Figure 3:
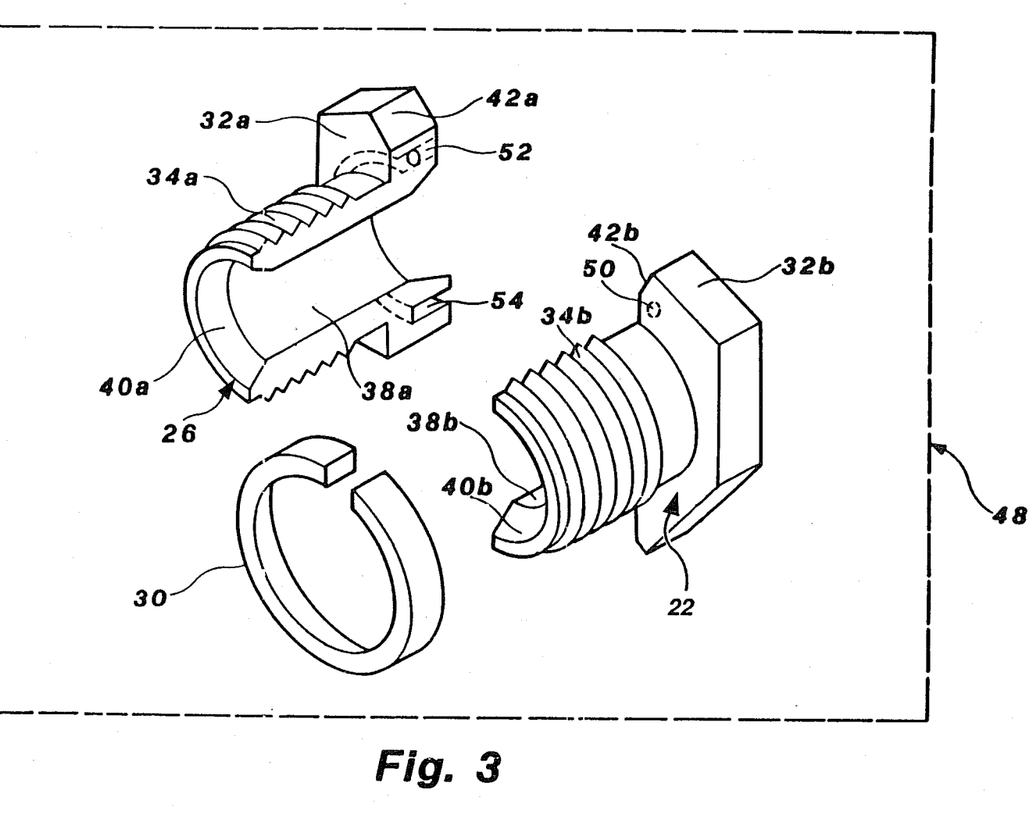
FIG. 3 is an exploded orthographic view of a second preferred embodiment of the subject invention showing the male half-gland member with its pin, the female half-gland member with its depression having a corresponding configuration and another version of the circular spring clip.

FIG. 3 is an exploded orthographic view of a second preferred embodiment of the subject invention 48 showing a pin 50 located on one of the flat inside surfaces of the male half-gland member 22 and the correspondingly configured depression 52 located on one of the flat inside surfaces of the female half-gland member 26. A groove 54 is cut in the rear portion of the wrench-engaging head 32a, b in order to receive circular spring clip 30 in place of the groove 36a, b shown in FIG. 1. Groove 54 is substantially circular and is disposed in a concentric manner to the semicircular outer portion of the split gland. The combination of the pin and correspondingly configured depression and the somewhat more massive spring clip provide the necessary rigidity of the assembled split gland to enable its being screwed into a receiving female member without cross threading the threaded portion thereof, while allowing the lateral insertion of a tube in the assembled split gland.

Figure 4:
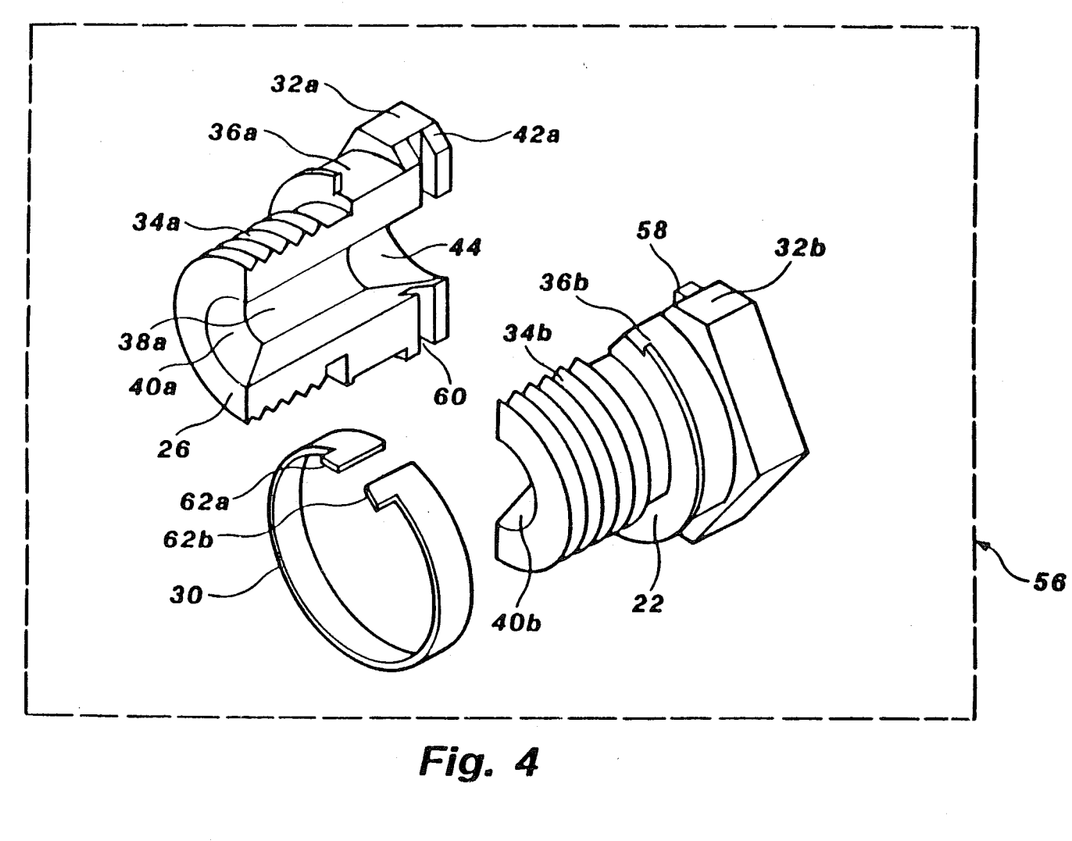
FIG. 4 is an exploded orthographic view of a third preferred embodiment of my invention showing the male half-gland member with its radial raised portion, the female half-gland member with its corresponding radial depression and a version of the circular spring clip similar to that shown in FIG. 1 hereof, except that tabs are provided thereon to prevent rotation thereof.

FIG. 4 is an exploded orthographic view of a third preferred embodiment of my invention 56 showing a radially disposed raised portion 58 in the male half-gland 22 and the matching groove 60 in the female half-gland 26. Circular spring clip 30 is similar to that shown in FIG. 1 hereof except that tabs 62a, b provided for locating the spring 30 in a slotted version of the spring groove 36a, b. As in the first and second preferred embodiment described herein above, and the culmination of the radially disposed matching raised portion and groove and the spring clip provided sufficient rigidity to enable the assembled split gland to be screwed into a female receiving gland without cross threading the threaded portions thereof while allowing the assembled split gland to be laterally snapped over a piece of tubing.

Figure 5:
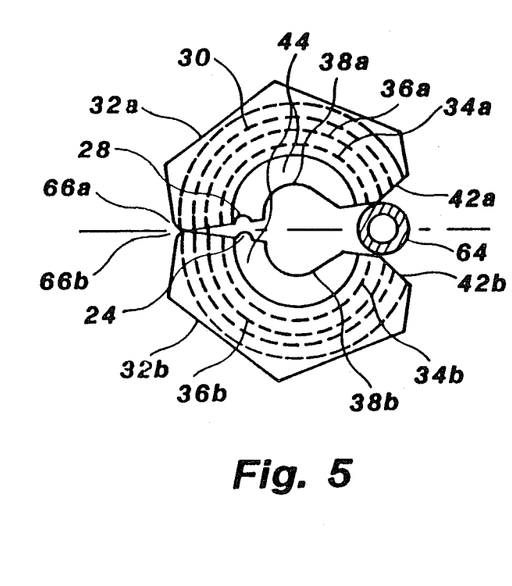
FIG. 5 is a schematic representation of the end view of the split gland for the embodiment of my invention shown in FIG. 1 hereof showing the teardrop-shaped, tube-receiving bore of the assembled split gland, the linear longitudinally disposed raised portion of the male member, the matching longitudinally disposed depression of the female member, the radiused notch, the tubing starting notch, and the circular spring clip. Shown is the assembled split gland being installed laterally over a tube.

FIG. 5 is a schematic representation of the end view of the split gland for the embodiment of the subject invention shown in FIG. 1 here of showing the teardrop-shaped tube-receiving bore 38a, b for the assembled split gland, the linear longitudinally disposed raised portion of the male member 24 and the matching longitudinally disposed depression of the female member 28, the circular spring clip 30, and the tube starting notch 42a, b. Shown is the assembled split gland being installed laterally over a tube 64. The tube-receiving bore of the assembled split gland has a cross-sectional teardrop configuration in order to facilitate the removal of a tube that has been inserted into the assembled split gland against the action of the spring clip 30. That is, as the tube presses against the smaller side of the tube-receiving bore, the force on the half-gland members tends to spread them apart. Shown also is a radius notch 66a, b which permits the insertion of a tube commensurate with the size of the tube-receiving bore without causing excessive spreading of the tube half-gland members, and accordingly spring clip 30.

Figure 6:
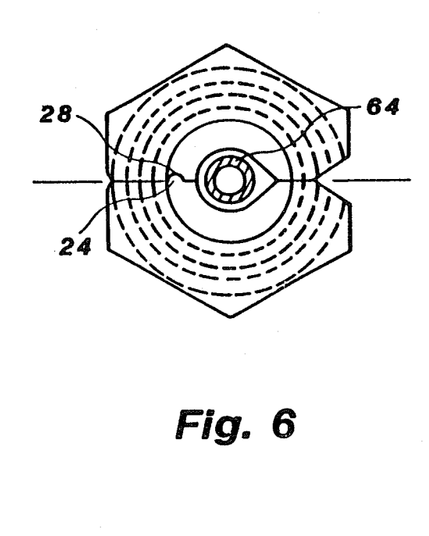
FIG. 6 is a schematic representation of the end view of the split gland described in FIG. 5 hereof after installation around a tube.

FIG. 6 is a schematic representation of the end view of the split gland described in FIG. 5 hereof after having been snapped around a tube 64. As illustrated, raised portion 24 mates with depression 28.

Figure 7:
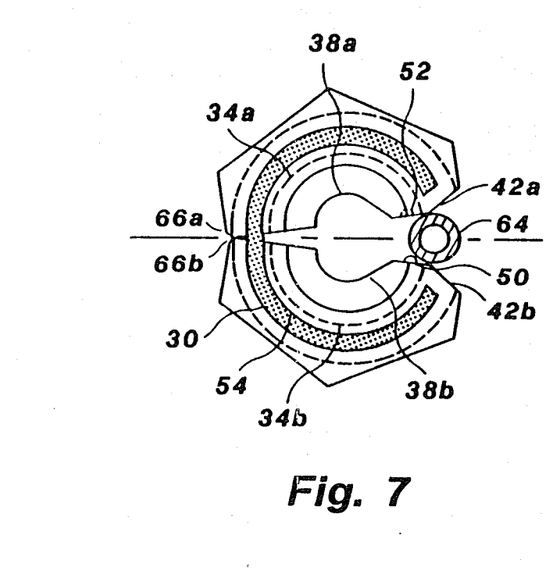

FIG. 7 is a schematic representation of the end view of a split gland of the embodiment of the present invention shown in FIG. 3 hereof showing the teardrop-shaped tube receiving bore 38a, b of the assembled split gland, the pin 50 of the male member, correspondingly configured depression 52 of the female member, a radiused notch 66a, b, the tubing starting notch 42a, b and the circular spring clip 30. Shown is the assembled split gland being installed laterally over a tube 64 note that, unlike the embodiment described in FIGS. 1, 5, and 6 hereof, the tubing must pass over the pin 50 of the male member and the spring clip that is located inside of the wrench-engaging head rather than around the outer parameter of the assembled glands. To avoid the former situation, the pin and the matching depression may be located on the side of the split gland away from the tube starting notch.

Figure 8:
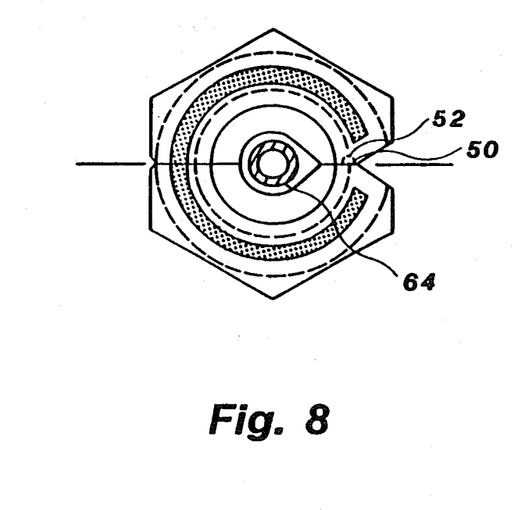
FIG. 8 is a schematic representation of the end view of the embodiment of my invention described in FIG. 7 hereof after installation around a tube.

FIG. 8 is a schematic representation of the end view of the embodiment of my invention described in FIG. 7 hereof after having been snapped around a tube. As illustrated, pin 50 mates with depression 52.

Figure 9:
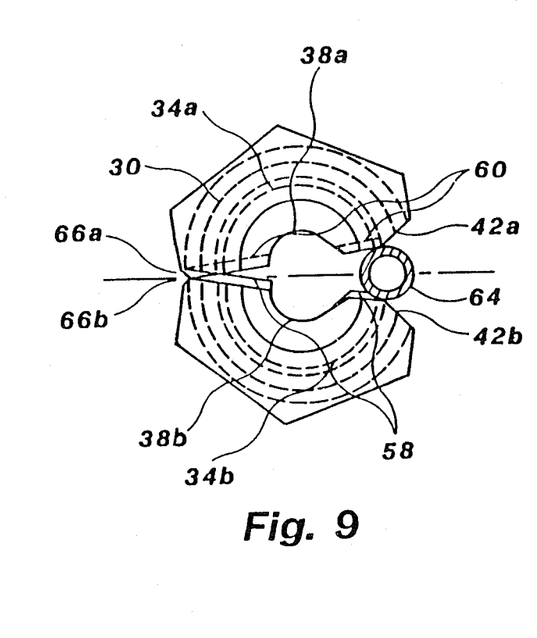
FIG. 9 is a schematic representation of the end view of the embodiment of the subject invention described in FIG. 4 hereof showing the teardrop-shaped tube receiving bore of the assembled split gland, the linear raised portion located along a diameter of the male member, the matching linear depression of the female member, the radiused notch, the tubing starting notch, and the circular spring clip. Shown is the assembled split gland being installed laterally over a tube.

FIG. 9 is a schematic representation of the end view of the embodiment of the subject invention described in FIG. 4 hereof showing the teardrop-shaped tube-receiving bore 38a, b of the assembled split gland, the linear raised portion 58 radially located relative to the axis of the male member, a matching linear depression 60 of the female member, the radius notch 66a, b, the tube starting notch 42a, b, and the circular spring clip 30 shown as the assembled split gland being installed laterally over a tube 64.

Figure 10:
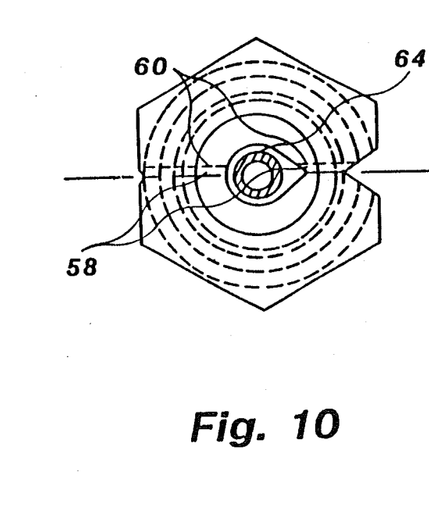
FIG. 10 is a schematic representation of the end view of the embodiment of my invention described in FIG. 9 hereof after installation around a tube.

FIG. 10 is a schematic representation of the end view of the embodiment of my invention described in FIG. 9 hereof after installation around a tube. As illustrated, raised portion 58 mates with depression 60.

Figure 11:
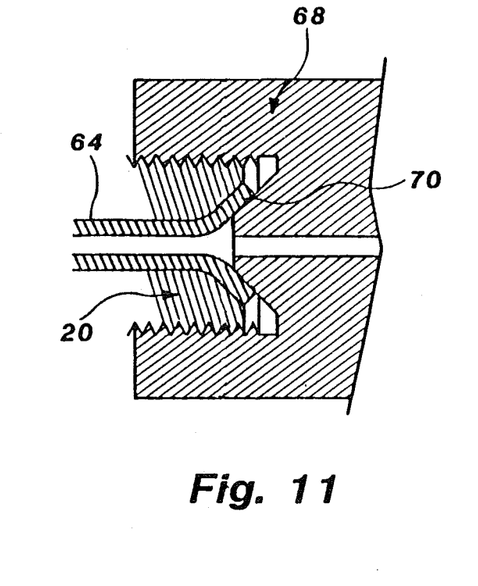
FIG. 11 is a schematic representation of the side view of the split gland for the embodiment of the subject invention shown in FIG. 1 hereof illustrating the split gland being threaded into a fitting which accommodates a tube having a flared end.

FIG. 11 is a schematic representation of the side view of the split gland for the embodiment of my invention shown in FIG. 1 hereof illustrating the split gland 20 being threaded into a fitting 68 which accommodates a tube 64 having a flared end 70.

Figure 12:
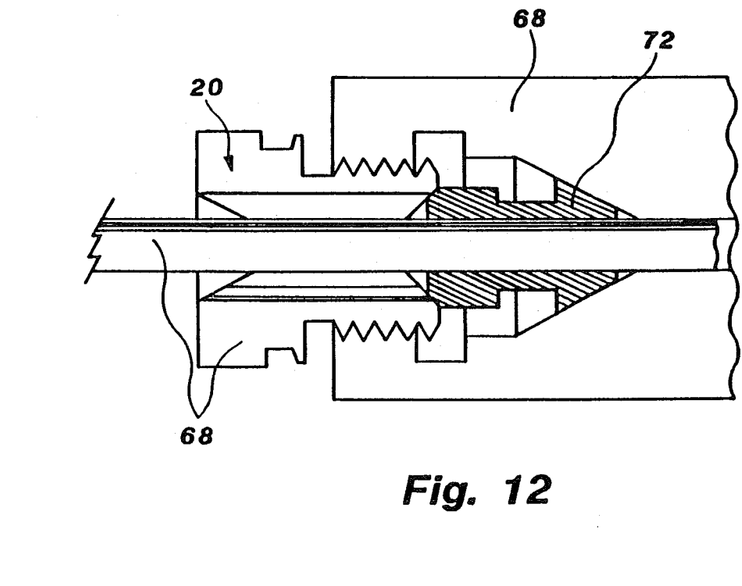
FIG. 12 is a schematic representation of the side view of the split gland for the embodiment of my invention shown in FIG. 1 hereof illustrating the split gland being threaded into a fitting which accommodates a tube having a ferrule thereon.

FIG. 12 is a schematic representation of the side view of the split gland for the embodiment of my invention shown in FIG. 1 hereof illustrating the split gland 20 being threaded into a fitting 68 having a ferrule 72 thereon.

Figure 14:
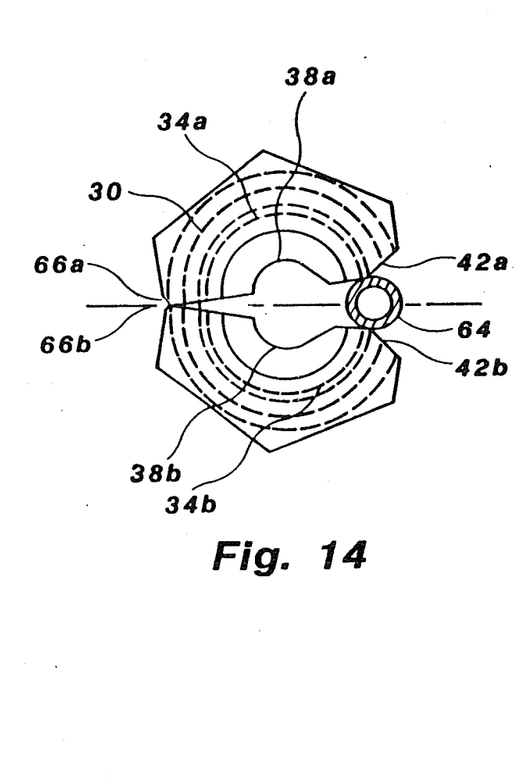
FIG. 14 is a schematic representation of the end view of the split gland for the embodiment of my invention shown in FIG. 13 hereof showing the teardrop-shaped, tube-receiving bore of the assembled split gland, the radiused notch, the tubing starting notch, and the circular spring clip. Shown is the assembled split gland being installed laterally over a tube.
Figure 15:
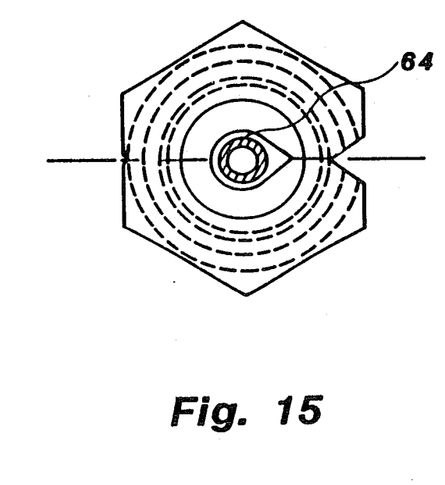
FIG. 15 is a schematic representation of the end view of the split gland described in FIG. 14 hereof after installation around a tube.

The foregoing description of the preferred embodiments of the invention have been presented for purposes of illustration and description. It is not intended to be exhaustive or to limit the invention to the precise form disclosed, and obviously many modifications and variations are possible in light of the above teaching. For example, in the situation where rigorous stability of the two half-gland members assembled as a gland with the consequential virtual freedom from the problems of cross threading fittings into which the assembled gland of the present invention is to be placed is not required, the embodiment of my invention shown in FIGS. 13–15 may be employed. In particular, the two half-gland members 22, 26 shown in FIG. 13 are constructed to be mirror images of one another. Circular spring groove 36a, b is made wider than for the other disclosed embodiments of my invention in order for it to receive an oversized circular spring clip 30 which is sufficiently stiff and wide to provide a significant stability of the two half-gland members which have no protrusions with matching indentations on their flat inner surfaces. The split gland of this embodiment 74 assembles in the same manner as that for the other disclosed embodiments and is shown in FIGS. 14 and 15. It would be apparent to one of ordinary skill in the mechanical arts to select the width of the the circular spring clip, its thickness, and material of construction to achieve the desired level of stability and reliability of the assembled split gland. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A split gland comprising:

a male half-gland member having a semicircular outer portion, two generally flat longitudinally disposed inner portions, a raised portion on one of the inner portions, and a groove disposed between the two inner portions, the outer portion having a male threaded portion disposed beginning at one end of said male half-gland member and a wrench-engaging portion disposed at the other end of said male half-gland member, said male half-gland member further having a tapered groove formed in a surface thereof;

a female half-gland member having a semicircular outer portion, two generally flat longitudinally disposed inner portions, a depression in one of the inner portions, and a groove disposed between the inner portions, the outer portion having a male threaded portion disposed beginning at one end of said female half-gland member and a wrench-engaging portion disposed at the other end of said female half-gland member, said female half-gland member further having a tapered groove formed in a surface thereof, the depression having a configuration which corresponds to the configuration of the raised portion, said female half-gland member being aligned with said male half-gland member when the raised portion is mated with the depression; and a resilient spring clip having a circumferential extent greater than 180°, said clip being positioned within the tapered groove of said male half-gland member and the tapered groove of said female half-gland member when said half-gland members are aligned to provide, in cooperation with the mated raised portion and depression, sufficient stability to the male threaded portions for screwing into a female receiving gland while permitting said half-gland members to be resiliently spread apart to enable the split gland to be laterally snapped over a tube.

2. The split gland of claim 1 wherein the raised portion and the depression are elongated and are longitudinally disposed.

3. The split gland of claim 2 wherein the tapered groove of each of said male and said female half-gland members is formed in the outer portion and is positioned between the male threaded portion and the wrench-engaging portion.

4. A split gland consisting essentially of:

a male half-gland member having a semicircular outer portion, two generally flat longitudinally disposed inner portions, a raised portion on one of the inner portions, and a groove disposed between the two inner portions, the outer portion having a male threaded portion disposed beginning at one end of said male half-gland member and a wrench-engaging portion disposed at the other end of said male half-gland member, said male half-gland member further having a tapered groove formed in a surface thereof;

a female half-gland member having a semicircular outer portion, two generally flat longitudinally disposed inner portions, a depression in one of the inner portions, and a groove disposed between the two inner portions, the outer portion having a male threaded portion disposed beginning at one end of said female half-gland member and a wrench-engaging portion disposed at the other end of said female half-gland member, said female half-gland member further having a tapered groove formed in a surface thereof, the depression having a configuration which corresponds to the configuration of the raised portion, said female half-gland member being aligned with said male half-gland member when the raised portion is mated with the depression; and a resilient spring clip having a circumferential extent greater than 180°, said clip being positioned within the tapered groove of said male half-gland member and the tapered groove of said female half-gland member when said half-gland members are aligned to provide, in cooperation with the mated raised portion and depression, sufficient stability to the male threaded portions for screwing into a female receiving gland while permitting said half-gland members to be resiliently spread apart to enable the split gland to be laterally snapped over a tube.

5. The split gland of claim 4 wherein the raised portion and the depression are elongated and are longitudinally disposed.

6. The split gland of claim 5 wherein the tapered groove of each of said male and said female half-gland member is formed in the outer portion and is positioned between the male threaded portion and the wrench-engaging portion.

* * * * *